US012201997B2

(12) United States Patent
Lafosse et al.

(10) Patent No.: US 12,201,997 B2
(45) Date of Patent: Jan. 21, 2025

(54) FLUID PRODUCT DISPENSER

(71) Applicant: APTAR FRANCE SAS, Le Neubourg (FR)

(72) Inventors: Alain Lafosse, Franqueville Saint Pierre (FR); Yann Kanarek, Rosay sur Lieure (FR)

(73) Assignee: APTAR FRANCE SAS, Le Neubourg (FR)

( * ) Notice: Subject to any disclaimer, the term of this patent is extended or adjusted under 35 U.S.C. 154(b) by 64 days.

(21) Appl. No.: 17/921,839

(22) PCT Filed: Apr. 27, 2021

(86) PCT No.: PCT/FR2021/050727
§ 371 (c)(1),
(2) Date: Oct. 27, 2022

(87) PCT Pub. No.: WO2021/219955
PCT Pub. Date: Nov. 4, 2021

(65) Prior Publication Data

US 2023/0158528 A1 May 25, 2023

(30) Foreign Application Priority Data

Apr. 28, 2020 (FR) ........................................ 2004229

(51) Int. Cl.
*B05B 11/10* (2023.01)

(52) U.S. Cl.
CPC ................................ *B05B 11/1046* (2023.01)

(58) Field of Classification Search
CPC ... B05B 11/049; B65D 41/34; B65D 41/0471; B65D 41/22; B65D 41/17; B65D 50/046; B65D 45/02

(Continued)

(56) References Cited

U.S. PATENT DOCUMENTS 8,757,409 B2 * 6/2014 Behar ................. B05B 11/1049 222/321.9
2009/0152303 A1 6/2009 Behar et al.
(Continued)

FOREIGN PATENT DOCUMENTS

FR 2 948 344 A1 1/2011
WO 2009/150351 A1 12/2009

OTHER PUBLICATIONS

International Preliminary Report on Patentability(PCT/IB/373) dated Oct. 27, 2022 issued by the International Searching Authority in International Application No. PCT/FR2021/050727.

(Continued)

*Primary Examiner* — Vishal Pancholi
*Assistant Examiner* — Robert K Nichols, II
(74) *Attorney, Agent, or Firm* — Sughrue Mion, PLLC

(57) ABSTRACT

A fluid product dispenser comprising:
- a reservoir (R) having a neck (1) defining at least one horizontal latching shoulder (1),
- a dispensing head (T) mounted on the neck (1) and comprising a dispensing member (P), and a fastening ring (F) engaging both the neck (1) and the dispensing member (P), the fastening ring (F) comprising a skirt (2) comprising at least one internal latching projection (21) that is received below said at least one horizontal latching shoulder (121),
- characterised in that said at least one horizontal latching shoulder (121) is formed on an oval base (11) of the neck (1) that has an oval outer wall (110) with a horizontal cross-section of generally oval shape, except at said at least one horizontal latching shoulder (121).

12 Claims, 5 Drawing Sheets

Figure 1:
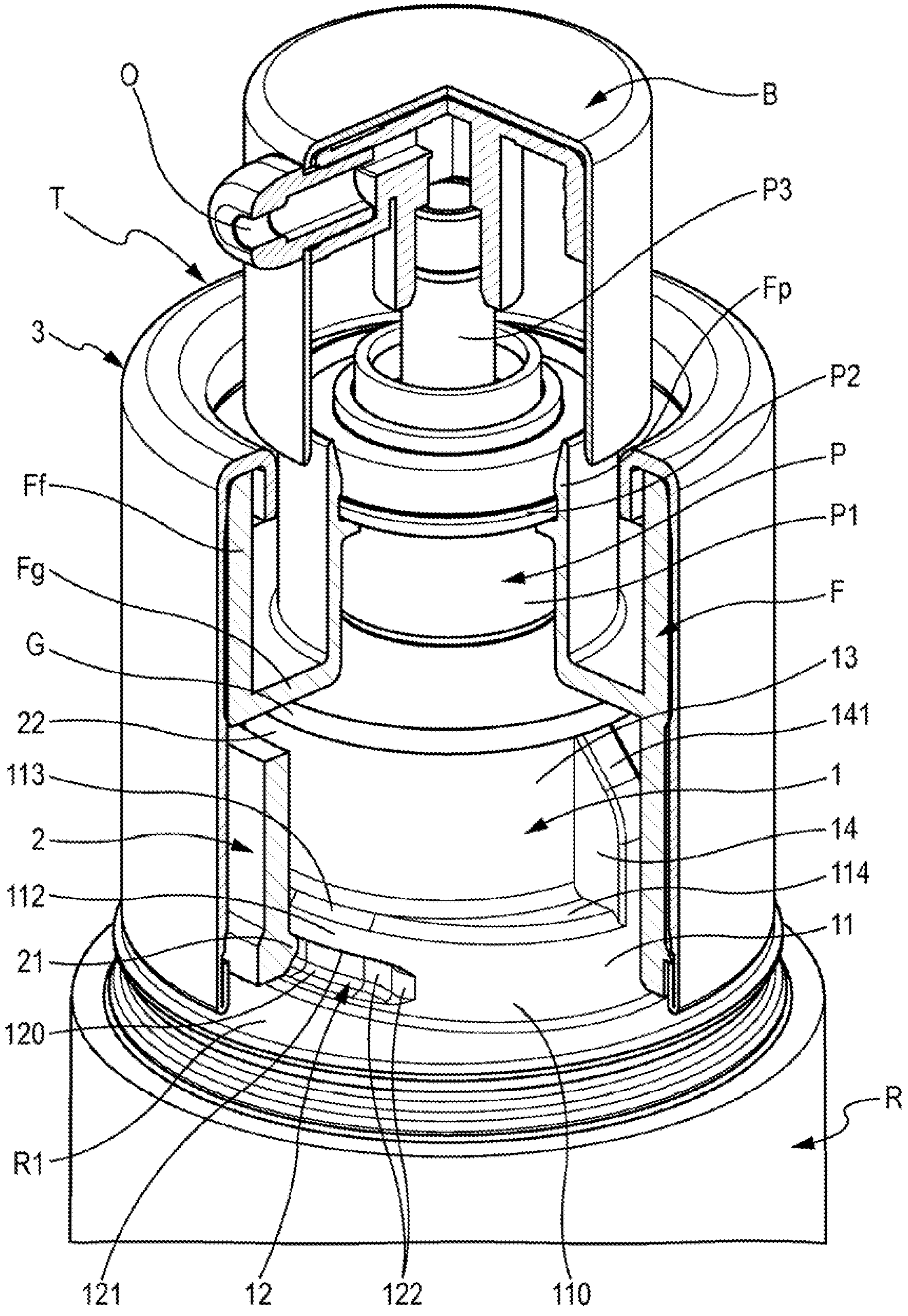

(58) Field of Classification Search
USPC ............................................ 222/383.1, 321.7
See application file for complete search history.

(56) References Cited

U.S. PATENT DOCUMENTS

| | | | | |
|---|---|---|---|---|
| 2017/0028421 | A1* | 2/2017 | Martines ................ | A45D 40/26 |
| 2020/0023391 | A1* | 1/2020 | Cesare ................... | B65D 77/06 |
| 2023/0173517 | A1* | 6/2023 | Lafosse ............... | B05B 11/1049 222/401 |

OTHER PUBLICATIONS

International Search Report for PCT/FR2021/050727 dated, Sep. 13, 2021 (PCT/ISA/210).

* cited by examiner

FLUID PRODUCT DISPENSER

CROSS REFERENCE TO RELATED APPLICATIONS

This application is a National Stage of International Application No. PCT/FR2021/050727 filed Apr. 27, 2021, claiming priority based on French Patent Application No. 2004229 filed Apr. 28, 2020.

The present invention relates to a fluid product dispenser comprising a fluid product reservoir having a neck internally defining an opening upward and communicating with the inside of the reservoir and externally at least one external latching shoulder oriented downward. The dispenser also comprises a dispensing head mounted on the neck of the reservoir and comprising a dispensing member, such as a pump or a valve, and a fastening member engaging both the neck of the reservoir and the dispensing member. The fastening member comprises a skirt forming at least one internal latching projection capable of axially engaging below the latching shoulder of the neck.

Such dispensers are frequently used in the fields of perfumery, cosmetics or also pharmacy.

In the prior art, document FR2948344 is known, which described a fastening system for removably fastening a dispensing member (pump or valve) on a reservoir neck. This system comprises:

- a fastening ring comprising flexible axial tabs capable of being latched around the reservoir neck, the tabs being separated by axial slots,
- a locking sleeve engaged around the fastening ring so as to block the tabs engaged around the neck.

The sleeve forms a plurality of locking sectors, intended to engage with the tabs to block them around the neck and a plurality of unlocking sectors not in contact with the ring. The sleeve is displaceable in rotation around the ring between a mounting position, in which the locking sectors are engaged with the tabs, and a dismounting position, in which the locking sectors are located at the slots to allow the tabs to be deformed to be released from their engagement with the neck.

This fastening system of the prior art has a plurality of disadvantages, and in particular:

- the sleeve must be able to rotate around the ring, which implies that the ring must be blocked in rotation on the neck,
- the gesture is not intuitive, as it involves first rotating the sleeve over a precise angle, then pulling on the sleeve to forcefully release the flexible tabs of the fastening ring from below the neck. Without any written operating instructions, it is not possible to remove a dispensing head from the neck with this fastening system.

In the prior art, also document WO2009/150351 is known, which describes a dispenser comprising a reservoir with a threaded neck and a fastening member comprising a deformable and malleable skirt intended to engage with the threaded neck, and a rigid band engaged around the skirt to radially push the skirt against the threaded neck so as to deform the skirt against the thread of the neck to create a thread imprint in the skirt. The skirt of the fastening member is therefore brought to engage with the threaded neck by a radial displacement inward, and not an axial displacement by rotation, as is the case with conventional threaded skirts. Before the first mounting of the skirt on a threaded neck, the skirt comprises no thread imprint: this is only during the radial thrust performed with the use of the band that the thread imprint is created by plastic deformation of the deformable and malleable skirt. The material constituting the deformable and malleable skirt plastically creeps around the threads of the neck of the reservoir to reach a final state with a satisfactory thread imprint.

This dispenser of the prior art thus allows to mount the skirt around the neck without rotation and then allows to remove the skirt from the neck by unscrewing. This dispenser therefore responds to a recycling requirement by allowing the separation of these constituent elements. However, it has been observed empirically that it is not possible to re-screw the skirt on the neck for a plurality of reasons. The first being that the contact between the skirt and the neck is extremely close and tight, such that there is absolutely no gap. The second comes from the fact that the skirt is slightly loosened when it is removed from the neck due to its malleability. The third reason is linked to the fact that the skirt is formed of flexible tabs separated by slots: when it is sought to re-screw the skirt, its tabs latch the thread of the neck and are put through, thus making re-screwing impossible. It is therefore not possible to reuse this dispenser, which does not respond to the current durability requirement.

The present invention aims to propose another type of removable fastening, the mounting of which is performed also by pure axial thrust, but which implements a snap-fitting or gripping without deformation/material creeping and without the use of a band or of a blocking sleeve. The release of the ring (skirt) is performed simply by a natural and intuitive motion of rotation of the ring (skirt) around the neck, but without the use of a thread.

To do this, the present invention proposes a fluid product dispenser comprising:

- a fluid product reservoir having a neck internally defining an axial opening oriented upward and communicating with the inside of the reservoir, the neck (1) externally defining at least one horizontal latching shoulder oriented downward,
- a dispensing head mounted axially on the neck of the reservoir, the head comprising a dispensing member, such as a pump or a valve and a fastening ring engaging both the neck of the reservoir and the dispensing member, the fastening ring comprising a skirt comprising at least one internal latching projection which is received below said at least one horizontal latching shoulder,
- characterised in that said at least one horizontal latching shoulder is formed at an oval base of the neck which forms an oval outer wall having a horizontal cross-section of generally oval shape, except at said at least one horizontal latching shoulder.

Advantageously, the internal latching projection(s) is/are formed at a skirt of the neck which has a horizontal cross-section of generally oval shape, such that the skirt substantially surrounds, without gap, the oval base of the neck with the internal latching projection(s) engaged below the respective horizontal latching shoulder(s).

It is the relative rotation between the two oval-shaped elements which will allow the internal latching projection(s) below the respective horizontal latching shoulder(s). More specifically, it is the elastic deformation of the oval skirt to a less oval or rounder shape which will extract or disengage the internal latching projection(s) from below the respective horizontal latching shoulder(s).

According to an advantageous embodiment, the oval base can further form at least one release ramp, the latching projection, initially in latching engagement below its respective horizontal latching shoulder, being constrained radially outward on the release ramp by rotation of the skirt around the oval base of the neck, thus releasing the latching projection from its latching engagement from below the latching shoulder. Advantageously, the release ramp connects two neck zones which are radially offset and located axially at the same level, namely a bottom zone located axially below a horizontal latching shoulder and the oval outer wall.

Contrary to documents FR2948344 and WO2009/150351, the rotation of the skirt allows to disengage the latching projection(s) from below the respective latching shoulder by urging it (or them) radially outward by means of ramps, which are distinct from the latching shoulders. The latching of the projection under the shoulder is fully ensured by the skirt, without the use of a blocking band or sleeve. The ramp(s) can be qualified as "vertical", as its largest slope is horizontal.

According to an aspect of the invention, the oval base can form at least one latching recess (and preferably two) which is recessed from the oval outer wall, this latching recess forming the horizontal latching shoulder, the bottom zone and advantageously at least one release ramp. The latching recess can be partially or fully surrounded by the overall outer wall and only constitutes the single defect in the "ovality" of the oval outer wall. The oval outer wall can therefore be fully cylindrical, except in the place of the latching recess(es).

According to another aspect of the invention, the oval base defines two parts of high curvature and two parts of low curvature, and the skirt defines two high curvature sectors and two low curvature sectors, said at least one horizontal latching shoulder being located at at least one low curvature part, and said at least one internal latching projection being located at at least one low curvature sector.

Advantageously, the oval base forms at least one radial expansion ramp axially above the horizontal latching shoulder to elastically deform the skirt such that the internal latching projection can engage by elastic loosening below its respective horizontal latching shoulder. This expansion ramp can be presented in the form of a simple ridge, slope or cam oriented outward and upward and on which the internal latching projection can slide with friction.

According to another feature of the invention, the neck can comprise a circular cylindrical funnel which extends axially upward from the oval base, this circular cylindrical funnel having two supports disposed diametrically opposite, each support forming an angular indexing ramp which extends radially outward and upward by connecting the circular cylindrical funnel to the oval outer wall. Preferably, the external diameter of the funnel is less than the smallest dimension of the oval base, such that an annular edge is formed by the oval base all around the funnel.

According to another aspect, the fastening ring can comprise an annular flange from which the skirt extends downward, the skirt defining two high curvature sectors and two low curvature sectors, the two low curvature sectors being separated from the annular flange by horizontal slots to confer a radial deformation capacity to the two low curvature sectors. Instead of these two horizontal slots, four vertical slots can also be provided, which separate the sectors from one another.

According to another aspect, the fastening ring can comprise a circular cylindrical mounting socket, which extends upward from the annular flange, this mounting socket overhanging the oval skirt, a trim band being engaged with friction around the mounting socket, this trim band radially remotely surrounding the oval skirt and advantageously coming into contact with an annular plate of the neck.

Advantageously, the oval outer wall can define two horizontal bars disposed diametrically opposite at low curvature parts, each horizontal bar comprising axially below it, a latching recess and axially above it, a radial expansion ramp, a horizontal latching shoulder being defined at the junction of the latching recess and of the horizontal bar. Moreover, the skirt can define two low curvature sectors disposed diametrically opposite and each forming an internal latching projection, a horizontal slot being formed axially above each low curvature sector.

The spirit of the present invention resides in the fact that the neck of the reservoir has, in horizontal cross-section, an oval configuration at which a latching of the skirt of the fastening member is performed. This oval configuration is used to release the fastening ring from its latching by mutual rotation. The release by rotation is enabled or facilitated by the presence of release ramps which will induce a local radial expansion of the skirt.

The invention will now be more fully described in reference to the accompanying drawings, giving as a non-limiting example, an embodiment of the invention.

Figure 2:
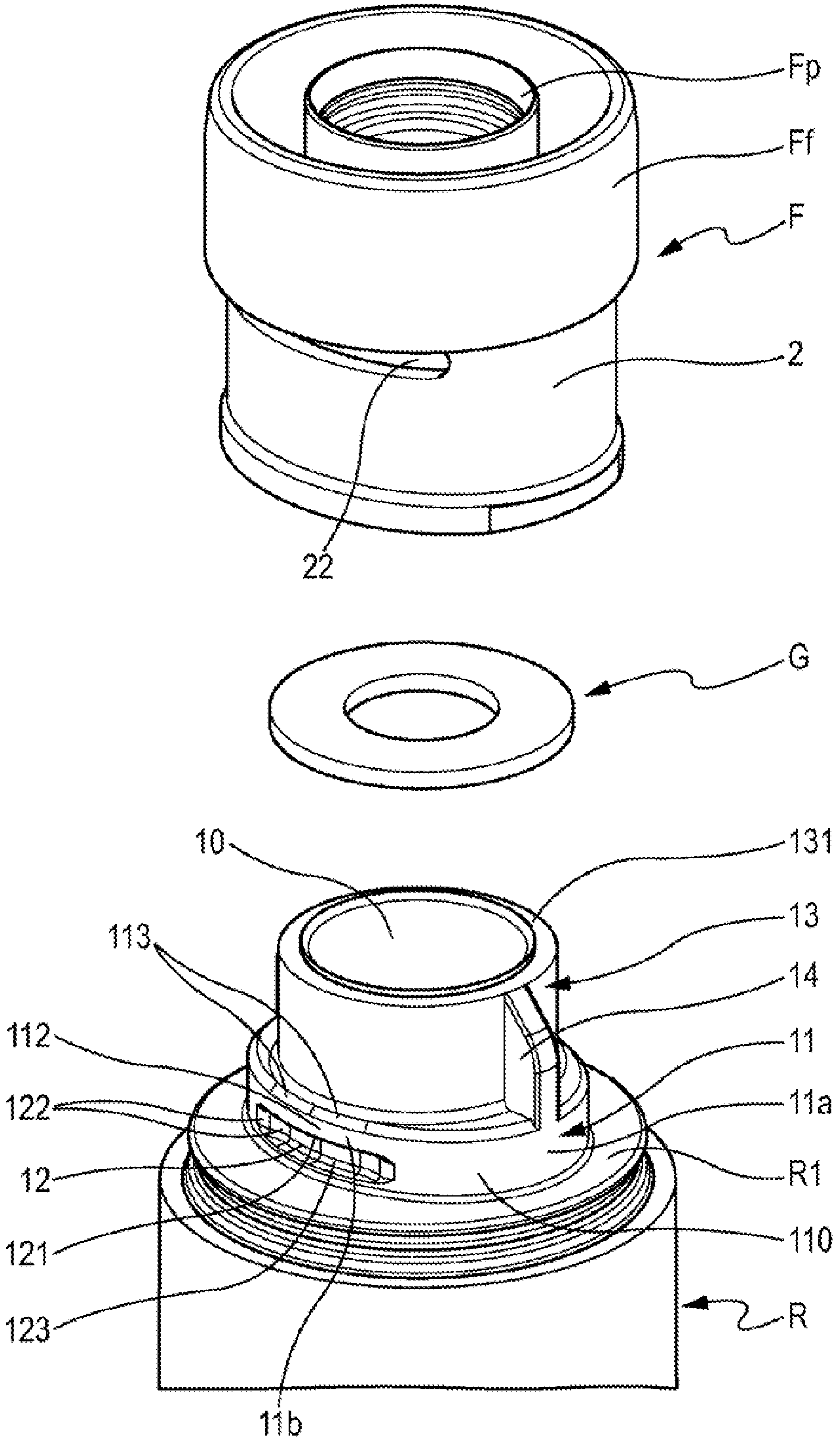
Figure 3:
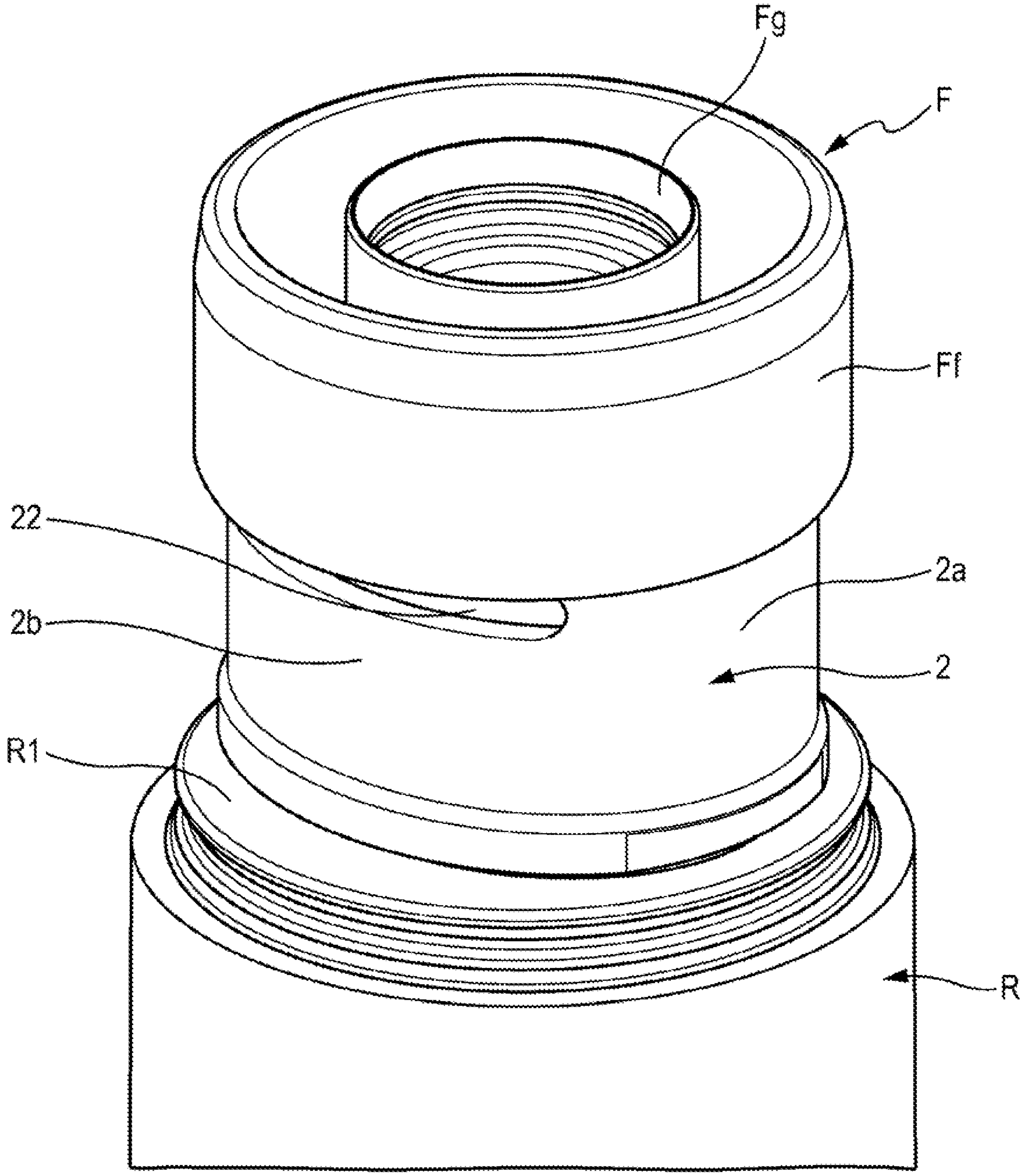
Figure 4:
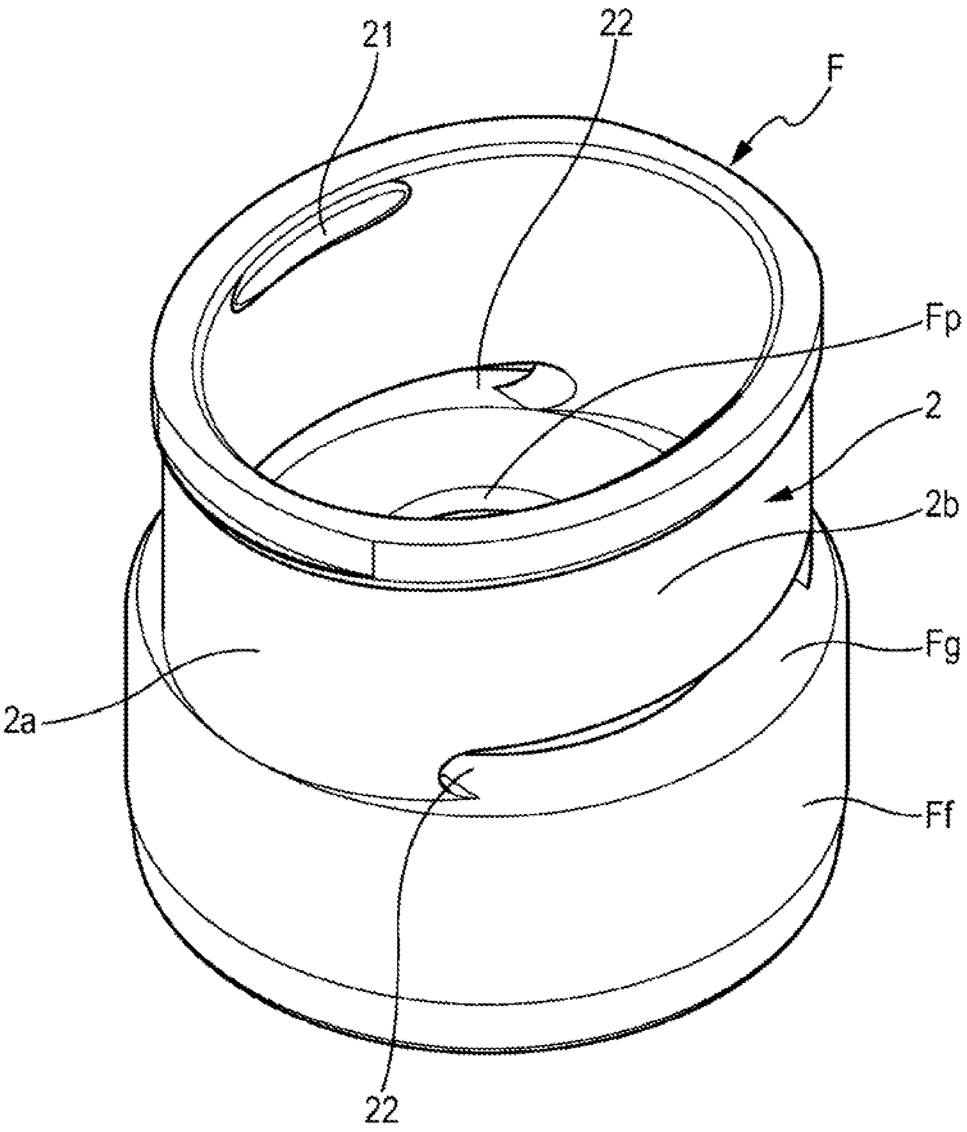
Figure 5A:
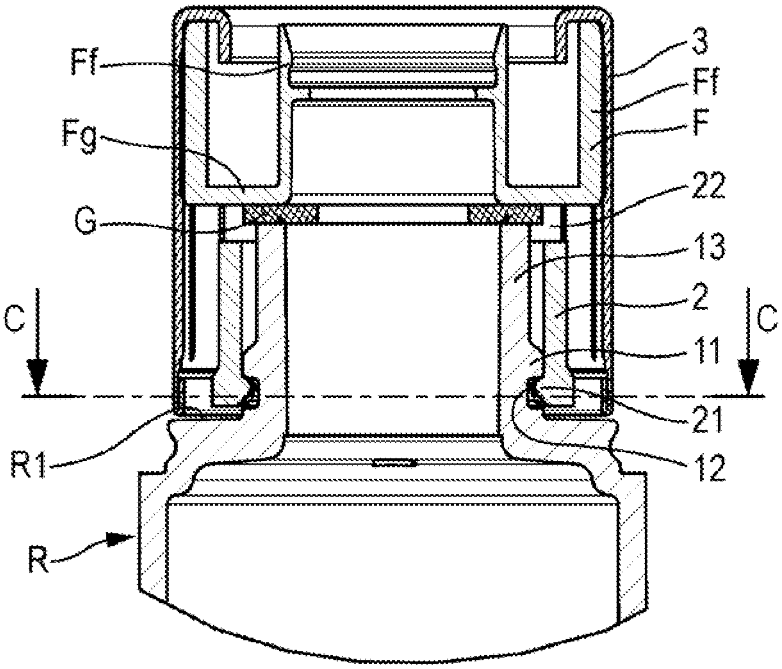
Figure 5B:
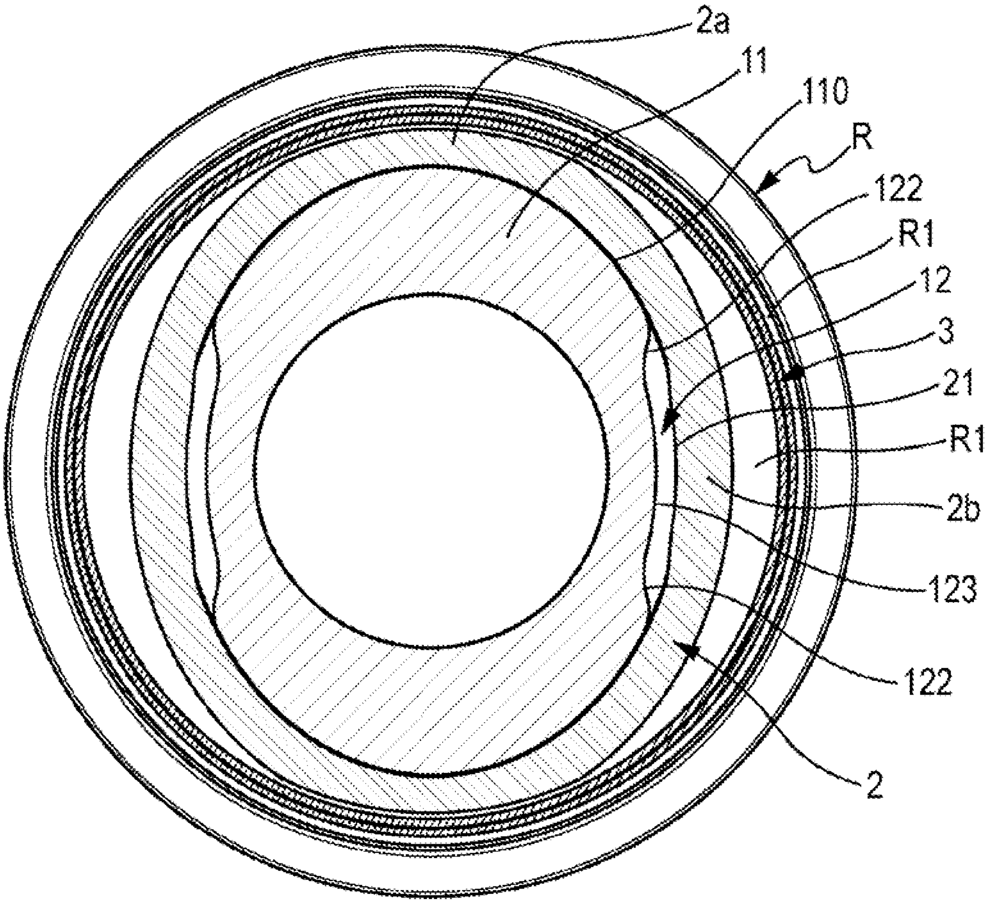

In the figures:

FIG. 1 is a perspective, partially cross-sectional view of a dispenser according to the invention, showing the design of a reservoir neck and of a fastening ring according to the invention, FIG. 2 is a perspective, exploded view of a fastening ring and of a neck according to the invention, with an interposed neck joint, FIG. 3 is a perspective view in the mounted state of the fastening ring and of the neck of FIG. 2, FIG. 4 is a perspective view through the fastening ring of the invention, FIG. 5*a* is a vertical cross-sectional view of the dispenser of FIG. 1, and FIG. 5*b* is a horizontal cross-sectional view along the line c-c of the dispenser of FIG. 5*a*.

The fluid product dispenser represented in FIG. 1 to illustrate the present invention comprises two distinct parts or subassemblies, namely a fluid product reservoir R and a dispensing head T intended to be mounted on the reservoir to together constitute the dispenser.

The fluid product reservoir R is only partially represented in the figures. Only the neck 1 and a part of the plate R1 of the reservoir R has been represented in the figures. The neck 1 projects axially upward from the plate S which already forms a part of the body of the reservoir. The neck 1 internally defines an opening 10 which is oriented upward and which makes the inside of the reservoir communicate with the outside. The opening 10 is delimited by an annular upper edge 131 of the neck 1.

Externally, the neck 1 comprises or forms an oval base 11 which extends upward from the plate R1. This oval base 11 forms an oval cylindrical outer wall 110 having a horizontal cross-section of generally oval shape. The oval cylindrical outer wall 110 thus has two high curvature parts 11*a* and two low curvature parts 11*b*. The oval cylindricality of the oval cylindrical outer wall 110 is interrupted by two latching recesses 12 which extend horizontally in a recessed manner. These latching recesses 12 are formed at two low curvature parts 11*b* and are therefore disposed diametrically opposite. Each latching recess 12 forms the bottom zone 120, a horizontal latching shoulder 121 and at least one release ramp 122. The horizontal latching shoulder 121 is formed by the upper edge of the recess 12 which forms a sharp ridge favouring the latching. The release ramp 122 is formed by a lateral edge of the recess 12, which softly joins the oval cylindrical outer wall 110. There can be one or two release ramp(s) per recess 12. The lower edge of the recess 12 can be located at or in the proximity of the plate R1.

Above each recess 12, the oval outer wall 110 defines two horizontal bars 112, which are also disposed diametrically opposite at low curvature parts 11*b* of the oval base 11. Above each horizontal bar 112 is formed a radial expansion ramp 113.

The neck 1 also comprises a circular cylindrical funnel 13 which extends axially upward from the oval base 11. Thus, two crescent moon-shaped flat tracks 114 make the junction between the oval base 11 and the circular cylindrical funnel 13. These flat tracks 114 have a maximum width at the high curvature parts 11*a* and end by pointing at two low curvature parts 11*b*. The external diameter of the circular cylindrical funnel 13 is less than the smallest dimension of the oval base 11, separating the two low curvature parts 11*b*. The two radial expansion ramps 113 are disposed between the two flat tracks 114 and thus connect in an inclined manner, the funnel 13 to the horizontal bars of the base 11. This circular cylindrical funnel 13 has two supports 14, which are disposed diametrically opposite at two high curvature parts 11*a*. Each support 14 forms an angular indexing ramp 141 which extends radially outward by connecting the circular cylindrical funnel 13 to the oval outer wall 11. The supports 14 interrupt the flat tracks 114.

The reservoir R, with a neck 1 thus profiled is preferably made of a rigid plastic material. Being made of glass or metal cannot however be excluded.

The dispensing head T mainly comprises two constitutive members, namely a dispensing member P, which can be a pump or a valve, and a fastening ring F engaging both the profiled neck 1 of the reservoir and the dispensing member P. A pushbutton B can be mounted on the dispensing member P to actuate it. A dispensing member can also be imagined without pushbutton, for example in the form of an applicator, a stopper or a pot cover.

The dispensing member P comprises a body P1 defining at one of its ends, an inlet for the fluid product coming from the reservoir. The body P1 forms a fastening collar P2 which projects radially outward. The dispensing member P also comprises an actuation rod P3 which projects outside of the body P1 upward and which is displaceable axially back-and-forth with respect to the body. A counter spring urges the actuation rod P3 in its most extended position outside of the body. The actuation rod P3 internally defines a backflow channel for the pressurised fluid product inside the body P1. This is an absolutely conventional design for a pump or a valve in the fields of perfumery, cosmetics or also pharmacy. Given that the internal structure of the dispensing member P is not critical for the present invention, it will not be further described.

The pushbutton B is mounted on the free end of the actuation rod P3 of the dispensing member P. The fluid product coming from the actuation rod P3 is driven through an internal channel to a dispensing hole O formed by the pushbutton. On the other hand, the pushbutton comprises a bearing surface on which the user can press using one or a plurality of fingers to displace the pushbutton B axially back-and-forth. In this manner, fluid product, in dosed form or not, is dispensed through the dispensing hole O. Again, this is an absolutely conventional design for a fluid product dispenser.

The fastening ring F is advantageously made of a slightly deformable plastic material, allowing to create relatively deformable zones, while other zones are more rigid. The ring F is preferably made of one piece.

The ring F comprises a skirt 2 which engages around the neck 1 of the reservoir, and more specifically around the oval base 11. The skirt 1 therefore surrounds the circular cylindrical funnel 13. Just like the oval base 11, the skirt 2 is oval in horizontal cross-section. It is generally cylindrical. The skirt 2 thus has two high curvature sectors 2*a* and two low curvature sectors 2*b*. On its internal face, the skirt 2 forms two internal latching projections 21 which are housed in the latching recesses 12, just below horizontal latching shoulders 121. For this, the internal latching projections 21 are formed at two low curvature sectors 2*b*. The projections 21 partially or totally fill the recesses 12. The projections 21 can be presented in the form of horizontal extended ribs, the ends of which are preferably rounded or soft, as can be seen in FIGS. 4 and 5*b*. Thus, they can softly cooperate with the release ramps 122 of the recesses 12.

The fastening ring F also forms a receiving housing Fp for the fastening collar P2 and an annular flange Fg which serves to flatten a neck joint G on the upper edge 14 of the neck 1. It can be noted in the figures that the two low curvature sectors 2*b*, where projections 21 are formed, are separated from the annular flange Fg by horizontal slots 22 to confer an increased radial deformation capacity to the two low curvature sectors 2*b*.

The fastening ring F comprises or also forms a cylindrical mounting socket Ff which extends upward from the annular flange Fg, this mounting socket Ff overhanging the oval skirt 2. It can be considered that the outer wall of the skirt 2 is flush with the outer wall of the socket Ff at its two high curvature sectors 2*a*, as can be seen in FIG. 4. A trim band 3 can be engaged with friction around the mounting socket Ff, such that this band 3 surrounds at a radial distance, the oval skirt 2 and advantageously comes into contact with an annular plate R1. The aim of the band 3 is purely aesthetic in relation to the ring F.

The manner in which the fastening ring F, and more specifically its skirt 2, cooperates with the neck 1 during a mounting operation will now be described.

The dispensing head T is brought onto the neck 1 with or without prior angular orientation: it can quite simply be deposited by gravity on the neck 1. Without angular orientation, it is slightly probable that the high curvature sectors 2*a* and the low curvature sectors 2*b* of the oval skirt 2 are respectively in line with the high curvature parts 11*a* and the low curvature parts 11*b* of the oval base 11. Regardless, since the two angular indexing ramps 141 will make the oval skirt 2 automatically rotate until the alignment of the axes of the ovals. The skirt 2 will thus be able to reach an intermediate mounting position without exerting any constraint on the dispensing head: only gravity has acted, in cooperation with the two ramps 141.

An axial thrust on the dispensing head T allows to constrain the latching projections 21 on the radial expansion ramps 113, which has the effect of elastically deforming the skirt 2 radially outward, until it passes over the bars 112, beyond which it can be elastically relaxed under the latching shoulders 121 in the recesses 12. The final mounting position is thus reached. The axial tensile strength is only ensured by the snap-fitting of the latching projections 21 under the latching shoulders 121.

It must be noted that the band 3 can be engaged around the skirt 2 before the mounting of the head T on the neck, given that the latching tabs 21 can be deformed radially outward, since they are positioned in an offset manner inward, thus leaving a radial articulation space between the latching tabs 21 and the band 3.

The manner in which the fastening ring F, and more specifically its skirt 2, cooperates with the profiled neck 1 during a dismounting operation from the final mounting position will now be described.

While the reservoir is fixedly held, a sufficient torque exerted on the band 3 will rotate the ring F with respect to the neck 1. This relative rotation has the effect of constraining the lateral edges of the latching projections 21 on the release ramps 122 of the recesses 12. The latching projections 21 will be elastically deformed radially outward, until they reach the oval outer wall 110 of the oval base 11. From this moment, the latching projections 211 are released from below the latching shoulders 121 and the dispensing head T can be separated from the neck by axial traction.

It must be noted that the dispensing head T can easily be remounted on the neck 1, after dismounting, by a user without any difficulty, as the remounting operation is identical to that of mounting.

From an operational standpoint, the oval shape of the base 11 and of the skirt allows to impose a relative angular orientation, which ensures the engagement of the projections 21 in the recesses 12. It also allows to elastically deform the skirt 2 to release the projections 21 from below the shoulders 121.

The three latching functions, of elastic deformation and of release, are essential, while the angular orientation function ensured by the ramps 141 is optional.

The invention claimed is:

1. A fluid product dispenser comprising:

a fluid product reservoir (R) having a neck (1) internally defining an axial opening (10) oriented upward and communicating with the inside of the reservoir (R), the neck (1) externally defining at least one horizontal latching shoulder (121) oriented downward, a dispensing head (T) mounted axially on the neck (1) of the reservoir (R), the head (T) comprising a dispensing member (P), and a fastening ring (F) engaging both the neck (1) of the reservoir (R) and the dispensing member (P), the fastening ring (F) comprising a skirt (2) forming at on an internal face of the skirt at least one internal latching projection (21) which is received below said at least one horizontal latching shoulder (121), wherein said at least one horizontal latching shoulder (121) is formed at an oval base (11) of the neck (1) which forms an oval outer wall (110) with a horizontal cross-section of generally oval shape, except at said at least one horizontal latching shoulder (121).

2. The dispenser according to claim 1, wherein the skirt has a horizontal cross-section of generally oval shape, such that the skirt (2) substantially surrounds, without gap, the oval base (11) of the neck with said at least one internal latching projection (21) engaged below said at least one horizontal latching shoulder (121).

3. The dispenser according to claim 1, wherein the oval base (11) forms at least one release ramp (122), the latching projection (21), initially in latching engagement below the horizontal latching shoulder (121), being radially constrained outward on the release ramp (122) by rotation of the skirt (2) around the oval base (11) of the neck (1), thus releasing the latching projection (21) from its latching engagement from below the latching shoulder (121).

4. The dispenser according to claim 3, wherein the release ramp (122) connects two neck zones which are radially offset and located axially at the same level, namely a bottom zone (123) located axially below said at least one horizontal latching shoulder (121) and the oval outer wall (110).

5. The dispenser according to claim 3, wherein the oval base (11) forms at least one latching recess (12) which extends into the cavity from the oval outer wall (110), this latching recess (12) forming horizontal latching shoulder (123), the bottom zone (123) and at least one release ramp (122).

6. The dispenser according to claim 1, wherein the oval base (11) defines two high curvature parts (11*a*) and two low curvature parts (11*b*), and the skirt (2) defines two high curvature sectors (2*a*) and two low curvature sectors (2*b*), said at least one horizontal latching shoulder (121) being located at at least one low curvature part (11*b*), and said at least one internal latching projection (21) being located at at least one low curvature sector (11*b*).

7. The dispenser according to claim 1, wherein the oval base (11) forms at least one radial expansion ramp (113) located axially above said at least one horizontal latching shoulder (121) to elastically deform the skirt (2) such that said at least one internal latching projection (21) can be engaged by elastic loosening below said at least one horizontal latching shoulder (121).

8. The dispenser according to claim 1, wherein the neck (1) comprises a circular cylindrical funnel (13) which extends axially upward from the oval base (11), this circular cylindrical funnel (13) having two supports (14) disposed diametrically opposite, each support forming an angular indexing ramp (141) which extends radially outward by connecting the circular cylindrical funnel (13) to the oval outer wall (11).

9. The dispenser according to claim 1, wherein the fastening ring (F) comprises an annular flange (Fg) from which the skirt (2) extends downward, the skirt (2) defining two high curvature sectors (2*a*) and two low curvature sectors (2*b*), the two low curvature sectors (2*b*) being separated from the annular flange (Fg) by horizontal slots (22) to confer a radial deformation capacity to the two low curvature sectors (2*b*).

10. The dispenser according to claim 1, wherein the fastening ring (F) comprises a circular cylindrical mounting socket (Ff) which extends upward from an annular flange (Fg), this mounting socket (Fg) overhanging the skirt (2), a trim band (3) being engaged with friction around the mounting socket (Ff), this trim band (3) surrounding, at a radial distance, the skirt (2) and advantageously coming into contact with an annular plate (R1).

11. The dispenser according to claim 1, wherein:

the oval outer wall (110) defines two horizontal bars (112) disposed diametrically opposite the low curvature parts (11*b*), each horizontal bar (112) comprising axially below it, a latching recess (12) and axially above it, a radial expansion ramp (113), a horizontal latching shoulder (121) being defined at the junction of the latching recess (12) and of the horizontal bar (112), the skirt (2) defines two low curvature sectors (2*b*) disposed diametrically opposite and each forming an internal latching projection (21), a horizontal slot (22) being formed axially above each low curvature sector (2*b*).

12. The dispenser according to claim 1, wherein: the dispensing member is a pump or a valve.

* * * * *